(12) United States Patent
Etoh et al.

(10) Patent No.: US 7,333,301 B2
(45) Date of Patent: Feb. 19, 2008

(54) MAGNETIC RECORDING HEAD AND METHOD FOR MANUFACTURING

(75) Inventors: Kimitoshi Etoh, Odawara (JP); Nobuo Yoshida, Odawara (JP); Moriaki Fuyama, Hitachi (JP); Makoto Morijiri, Ninomiya (JP); Kenichi Meguro, Matsuda (JP); Ichiro Oodake, Odawara (JP); Kazue Kudo, Odawara (JP); Yohji Maruyama, Iruma (JP); Katsuro Watanabe, Kanasagou (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 488 days.

(21) Appl. No.: 10/650,832

(22) Filed: Aug. 29, 2003

(65) Prior Publication Data
US 2004/0240121 A1 Dec. 2, 2004

(30) Foreign Application Priority Data
May 27, 2003 (JP) .............................. 2003-148496

(51) Int. Cl.
*G11B 5/127* (2006.01)
(52) U.S. Cl. ...................................... 360/317
(58) Field of Classification Search ................ 360/317, 360/324.2, 324.11, 126, 318; 29/603.14, 29/324.1, 603.25
See application file for complete search history.

(56) References Cited

U.S. PATENT DOCUMENTS

| | | | |
|---|---|---|---|
| 5,995,342 A * | 11/1999 | Cohen et al. ................ | 360/126 |
| 6,191,916 B1 * | 2/2001 | Sasaki ........................ | 360/126 |
| 6,654,212 B2 * | 11/2003 | Hayakawa ................ | 360/324.2 |
| 6,668,442 B2 * | 12/2003 | Sasaki ........................ | 29/603.14 |
| 6,754,056 B2 * | 6/2004 | Ho et al. ................... | 360/324.2 |
| 6,819,532 B2 * | 11/2004 | Kamijo ................... | 360/324.11 |
| 6,948,231 B2 * | 9/2005 | Hsiao et al. ............. | 29/603.25 |
| 7,027,274 B1 * | 4/2006 | Sin et al. ................... | 360/324.2 |
| 7,057,865 B1 * | 6/2006 | Mao et al. ................ | 360/324.2 |
| 7,072,153 B2 * | 7/2006 | Koui et al. ............... | 360/324.1 |

FOREIGN PATENT DOCUMENTS

| | | |
|---|---|---|
| JP | 63-113812 | 5/1988 |
| JP | 10-270443 | 10/1998 |

* cited by examiner

*Primary Examiner*—Tianjie Chen
(74) *Attorney, Agent, or Firm*—Antonelli, Terry, Stout & Kraus, LLP

(57) ABSTRACT

A thin-film magnetic head having little temperature rise in the element, good heat dissipation and a short magnetic path length (narrow coil pitch) and manufacturing method for same is provided. To form the coil of the thin-film magnetic head, a lower coil is first formed and after forming alumina and an inorganic compound containing alumina, a trench is formed for the upper coil by reactive ion etching. The lower coil allows uniform etching at this time and functions as a film to prevent loading effects occurring during reactive ion etching. This trench is then plated in copper and chemical mechanical planarization performed to form the upper layer coil as the dual-layer coil of the present invention. Heat from the coil is efficiently radiated towards the substrate by alumina and an inorganic compound containing alumina with good heat propagation. The ratio of alumina or inorganic compound containing alumina in the lower coil can be selected by reactive ion etching so that an upper coil trench functioning as an etching stopper can be securely formed to allow forming a stable coil film thickness and a short magnetic path length.

24 Claims, 12 Drawing Sheets

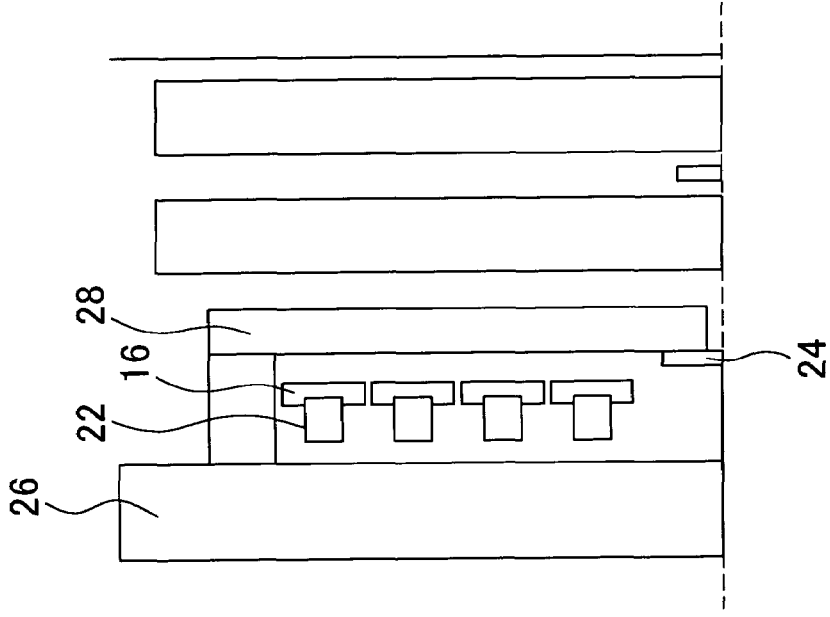
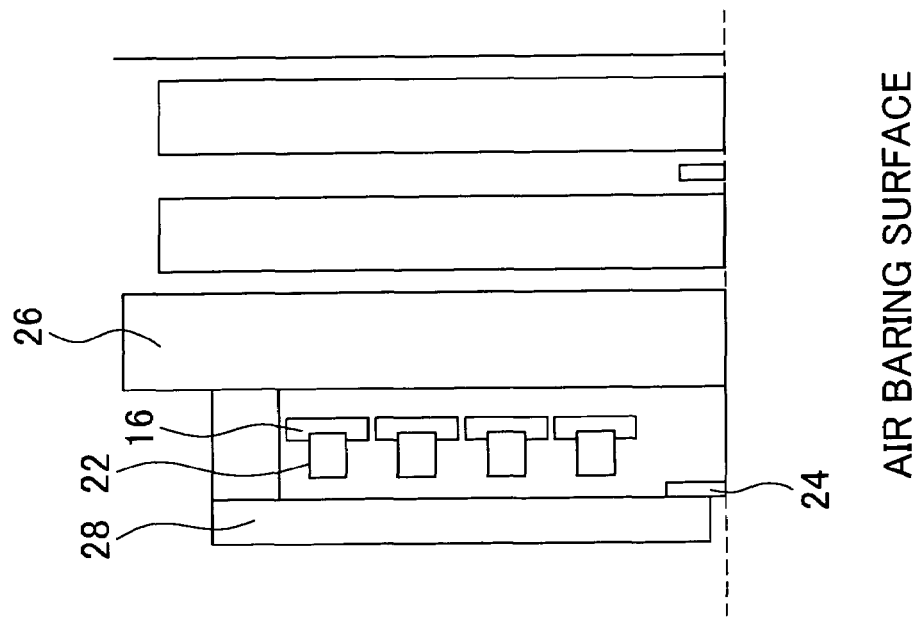
AIR BARING SURFACE

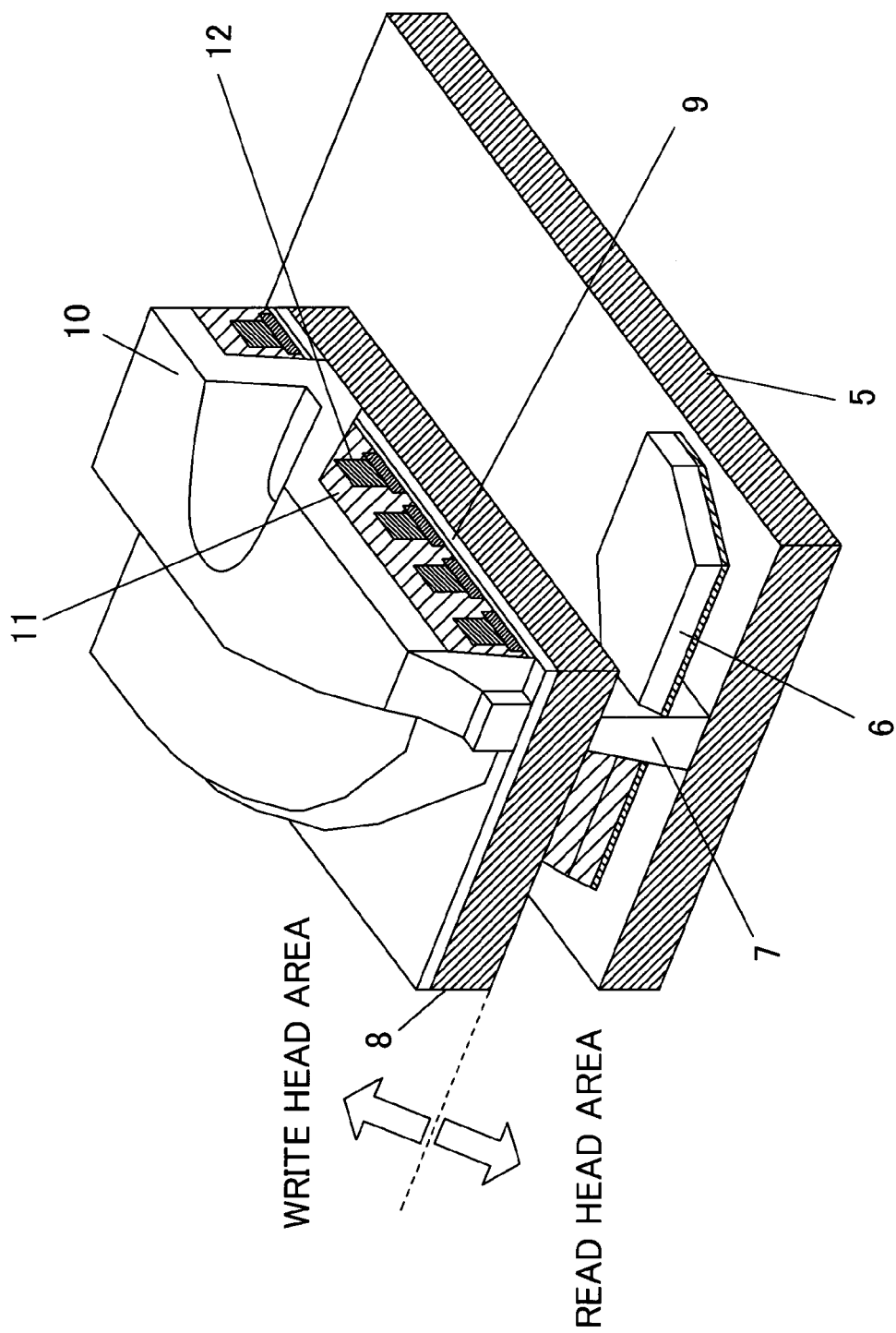

MAGNETIC RECORDING HEAD AND METHOD FOR MANUFACTURING

BACKGROUND OF THE INVENTION

1. Field of the Invention

The present invention relates to a magnetic head and a magnetic head manufacturing method.

2. Description of Related Art

In recent years advances have been made in making thin-film magnetic heads used in magnetic disk units with greater area recording density and high speed data transfer. Along with making the shape of these thin-film magnetic heads ever more compact, accuracy has also been improved. A thin-film magnetic head with a short magnetic path is particularly effective in device high-speed data transfer. Forming this short magnetic path requires forming a high density coil in limited section of the magnetic head.

To form a coil, usually a plated underlayer is first formed on an alumina and inorganic material containing alumina. A spiral-shaped coil pattern layer of photoresist is then formed, Cu plating is then formed on this and the resist stripped away to form the coil. The so-called pattern plating method is utilized to form the coil conductor. The plated underlayer is then stripped away and resist formed over the entire coil surface to provide insulation between the coil conductor and upper magnetic layer, and coils. The resist in this way is shaped to cover the coil conductor.

[Patent Document 1]

JP-A No. 113812-1988

[Patent Document 2]

JP-A No. 270443-1998

The gap (separation) between the thin-film magnetic head and the magnetic record medium has become lower in recent years leading to a major problem called the thermal protection phenomenon (hereafter: TPR problem). In this phenomenon, when an electric current flows in the coil of the magnetic head, the element protrudes outward due to the rise in temperature in the head and makes unwanted contact with the medium. This TPR problem is caused by poor heat dissipation in the element due to the low heat propagation rate of the resist covering the coil. Resolving this TPR problem requires a better heat propagation rate in the material covering the coil, and improving the heat dissipation of the element.

Achieving a short magnetic path for high speed data transfer requires forming a coil in a limited region (within the head). The limited space requires forming the coil with a narrow pitch. If the resist frame height is made small, then the resist frame width can be made smaller to achieve a narrow pitch frame.

However, the resistance value of the coil conductor currently requires a coil film thickness of at least 1.5 μm so that the minimum required resist film thickness is at least 2.0 μm including the plating film thickness distribution. Reducing the resist frame height with the currently used forming method is therefore impossible. Also, at a narrow coil pitch of 2.0 μm or less, the resist constituting the insulation material (dielectric) cannot fill the area at this pitch and voids 23 occur (FIG. 4).

A technique was disclosed in JP-A No. 113812-1988 (Patent Document 1) for resolving this problem by dry etching an insulating film (dielectric) to form a coil pattern trench and copper plating then performed and the coil conductor formed to specified dimensions by mechanical polishing. However, when the method in JP patent No. 2588392 or JP-A No. 113812-1988 (Patent Document 1) and were actually implemented, the problem occurred that a coil trench with a uniform thickness could not be due to a microloading effect caused by the presence of patterns with different surface areas.

A technique was disclosed in JP-A No. 270443-1998 (Patent Document 2) through semiconductor technology, utilizing an etching stopper layer to counteract the microloading effect.

A pattern plating method forms a resist pattern as an insulating film (dielectric) to cover the coil. However, this method requires heat processing to harden the resist and has the problem that the heat processing causes deterioration of the reproducing element properties.

SUMMARY OF THE INVENTION

In view of the above problems with the related art, the present invention has the object of providing a thin-film magnetic head manufacturing method for forming coils in magnetic head having a structure with good heat radiation from the coil, a narrow coil pitch and precise control of forming the coil trench depth.

To achieve the above objects, the magnetic head of the present invention is composed of a lower shield layer, upper shield layer, magnetoresistive element formed between the lower shield layer and upper shield layer, lower layer magnetic pole, upper layer magnetic pole and a coil, wherein the coil is composed of a lower coil section and an upper coil section, and the width of the lower coil is larger than the width of the upper coil.

In the manufacturing method for the magnetic head of the present invention, to form the coil, a first inorganic film is formed on a lower magnetic core, a metallic film is formed on the first inorganic film, a lower layer photoresist of the same pattern as the lower coil is formed on the metallic film, a lower coil is formed by etching using the lower layer photoresist as a mask material, the lower layer photoresist is stripped away, a second inorganic film is formed by sputtering on the lower coil, an upper layer photoresist with the same pattern as the upper coil is formed in a specified shape the second inorganic film, a trench with the same pattern as the upper coil is formed on the second inorganic film by etching using the upper layer photoresist as mask material and the lower layer coil as a stopping layer, an underlayer film is formed in the trench, the upper layer photoresist is stripped away, and an upper coil is formed by plating on the metallic film in the trench.

The present invention utilizes a dual layer coil structure and the width of the lower coil is larger than the width of the upper coil so that the lower coil functions as a stopping film during etching, prevents non-uniform etching due to the loading effect and also improves heat dissipation. Deterioration in playback head characteristics from heat processing is therefore prevented.

BRIEF DESCRIPTION OF THE DRAWINGS

FIG. 9A and FIG. 9B are conceptual cross sectional drawings of the perpendicular head of the present invention (However, drawing enlargement scale is not uniform.);

FIG. 10 is a cross sectional concept view showing the thin-film magnetic head of the present invention (However, drawing enlargement scale is not uniform.);

DETAILED DESCRIPTION OF THE PREFERRED EMBODIMENTS

The magnetic head of the present invention is characterized in comprising a lower shield layer, an upper shield layer, a magnetoresistive element formed between the lower shield layer and upper shield layer, a lower layer magnetic pole, an upper layer magnetic pole and a coil, and the coil is composed of a two-layer structure divided into a lower coil section and an upper coil section, and the width of the lower coil is larger than the width of the upper coil.

The two-layer coil is preferably formed by enclosing it in an alumina or inorganic compound containing alumina. By enclosing the entire dual-layer coil in alumina or an inorganic compound containing alumina having good heat propagation, a thin-film magnetic head with improved heat conductance and excellent heat dissipation can be achieved.

Figure 6:
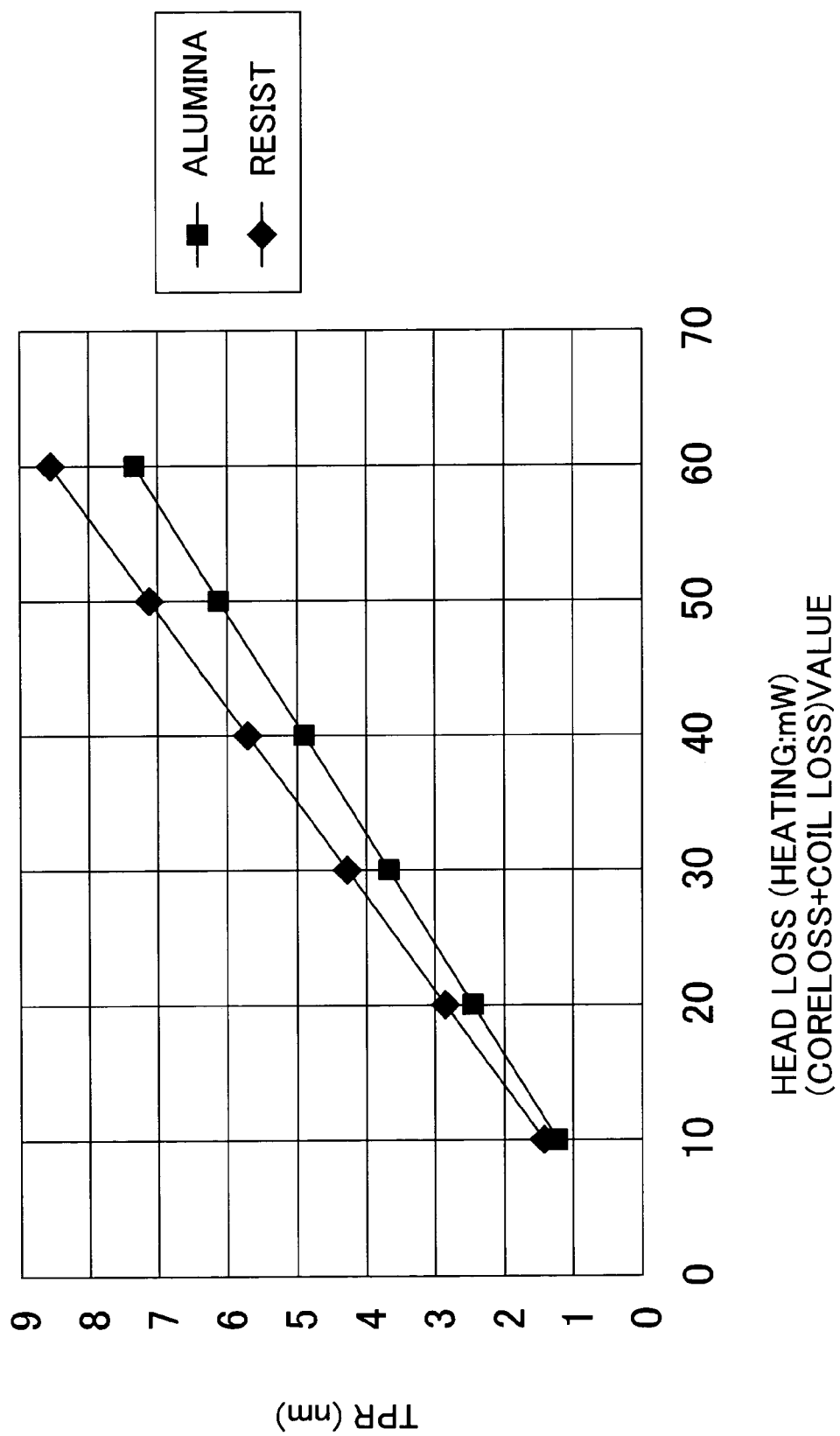
FIG. 6 is a graph showing the relation between the amount of TPR (thermal protrusion phenomenon) and head loss (calorific value) when alumina and when resist were used as the coil insulating material.

FIG. 6 shows the calculated amount of TPR when the material covering the coil which is normally resist, was changed to alumina. The horizontal axis shows the coil loss (calorific value) and the vertical axis shows the amount of TPR. The alumina clearly shows a smaller TPR effect than resist. This figure shows the effectiveness of using alumina with its good heat propagation as the material for enclosing the coil.

Figure 7:
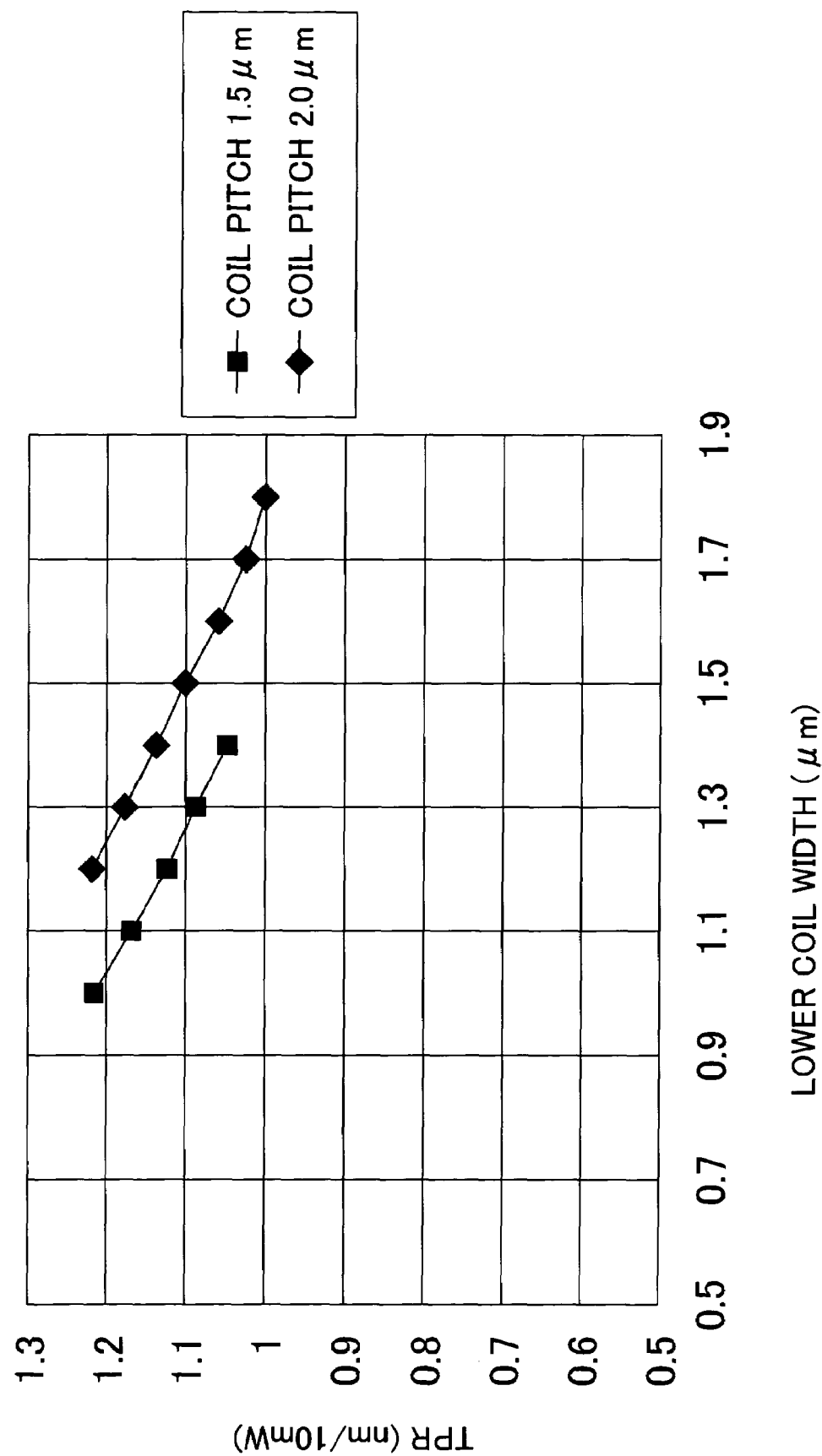
FIG. 7 is a graph showing the change in TPR amount when the lower coil width was changed.

FIG. 7 is a graph showing the calculated amount of TPR when using alumina in the insulating film, and the lower coil width was changed from a coil pitch of 1.5 μm (upper coil width of 0.75 μm, coil spacing of 0.75 μm) to a coil pitch of 2.0 μm (upper coil width of 1.0 μm, coil spacing of 1.0 μm).

The horizontal axis is the lower coil width and the vertical axis is the amount of TPR. The calculated results show that for both pitches, widening the lower coil width more than the upper coil width reduces the amount of TPR. The widening of the contact surface area with alumina or an inorganic compound containing alumina probably caused the improved heat dissipation characteristic. These results show that the two-layer coil structure is effective in alleviating the TPR problem.

Changing the material covering the coil from resist to alumina or an inorganic compound containing alumina eliminates the need for a heat treatment usually required to harden the resist. Consequently, the deterioration in playback head characteristics due to heat treatment can be prevented.

The benefit of using this magnetic head manufacturing process is that by forming the lower coil beforehand to match the upper coil section, the alumina or an inorganic compound containing alumina can be utilized as a stopping film when forming the coil trench by RIE (reactive ion etching) during two-layer coil fabrication. This lower coil section functions as a stopping film to prevent the microloading effect that occurs during RIE, and a uniform trench of alumina or an inorganic compound containing alumina can be formed.

The lower coil of the two-layer coil of the present invention in other words functions as a stopping film during etching of the alumina insulating film, prevents non-uniform etching due to the loading effect, and improves heat dissipation.

Actual embodiments of the magnetic head of the present invention are described next based on the work drawings.

Figure 1:
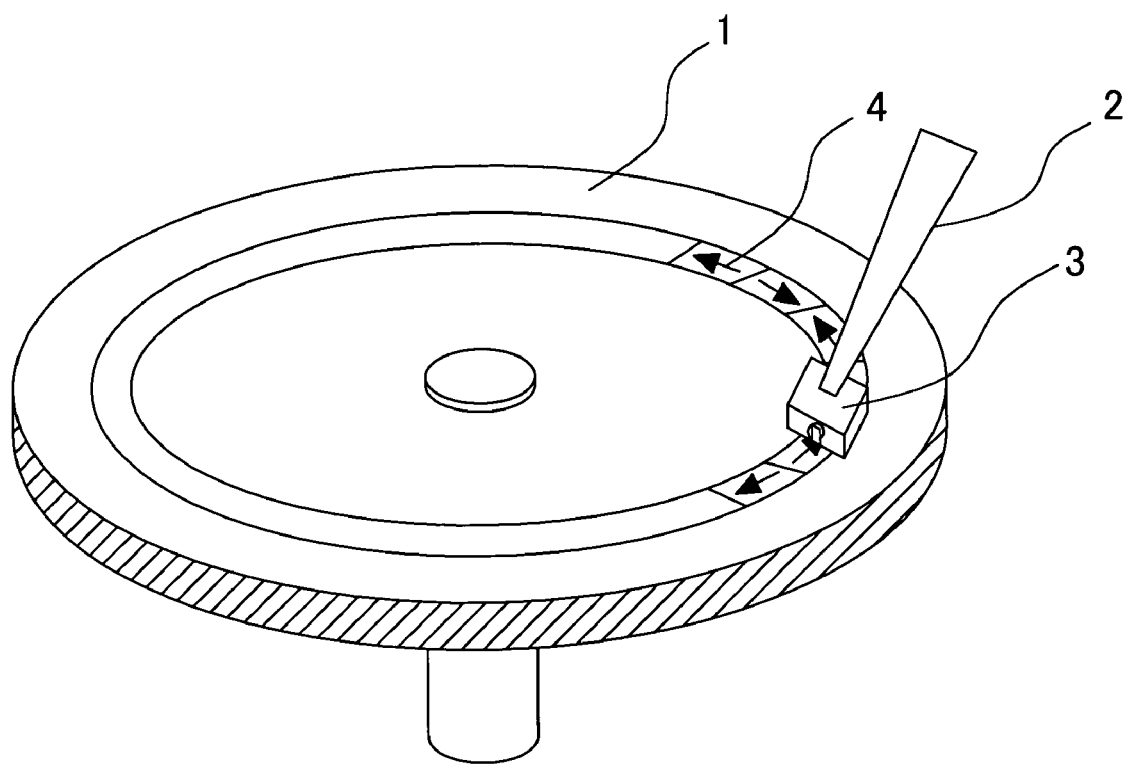
FIG. 1 is a concept view showing the magnetic disk unit of the first embodiment of the present invention (However, drawing enlargement scale is not uniform.)

FIG. 1 is a concept view showing the magnetic disk unit of the first embodiment of the present invention. The magnetic disk unit records and plays a magnetic signal 4 from the magnetic disk 1, using the magnetic head 3 attached to the end of a support piece 2.

Figure 2:
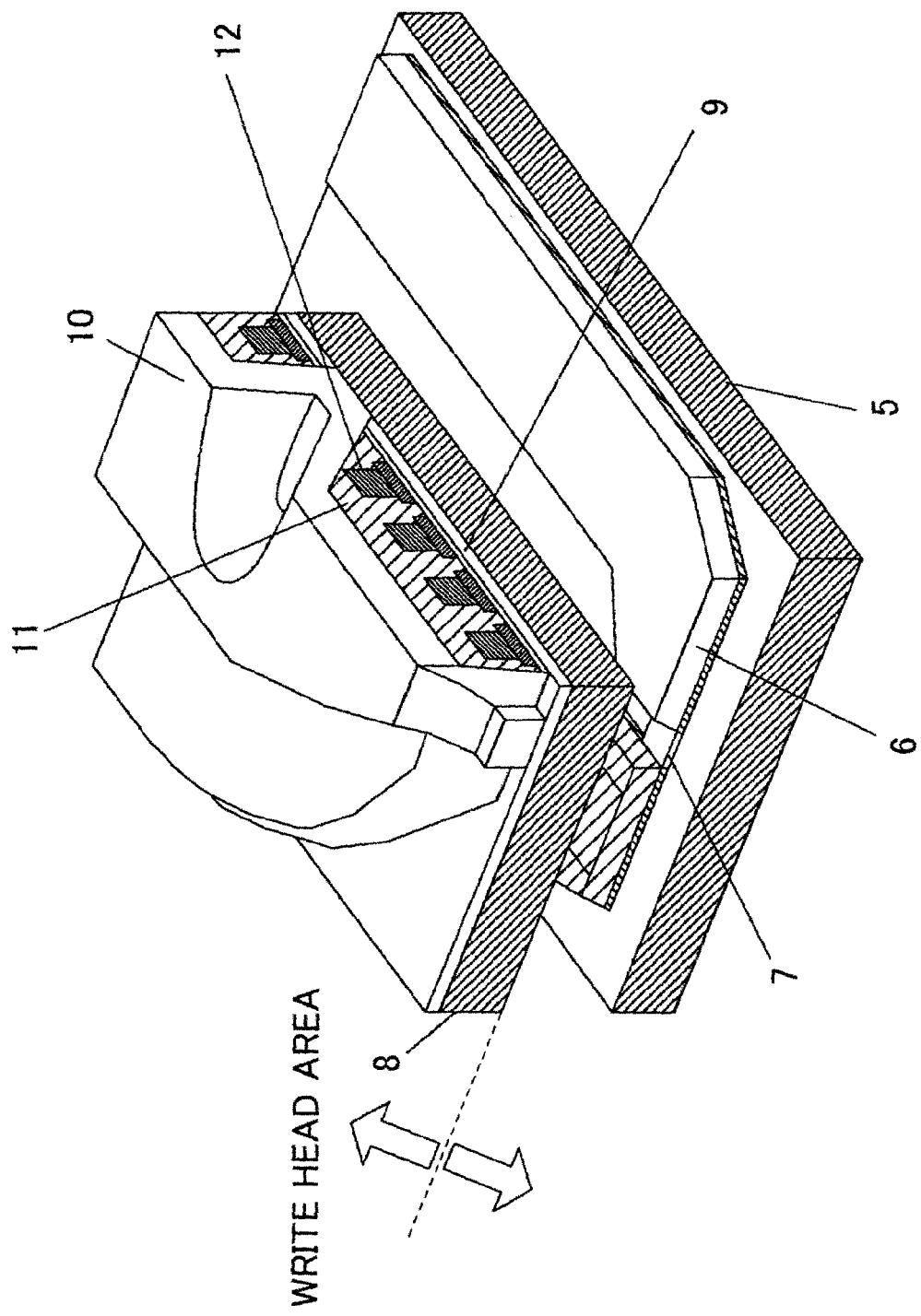
FIG. 2 is a cross sectional concept view showing the thin-film magnetic head of the present invention (However, drawing enlargement scale is not uniform.)

FIG. 2 is a conceptual cross sectional view of segmented record/playback thin-film magnetic head. In the recording head of the present invention and the manufacturing process, the magnetic head is separated into a playback head section containing a giant magnetoresistive layer 7 between the domain control layers 6 on the lower magnetic shield 5 and, a recording head (section) possessing the two-layer coil 12 of the present invention magnetically insulated by the alumina or inorganic compound containing alumina 11, installed between an upper magnetic core 10 and a lower magnetic core 9 installed on the upper magnetic shield 8.

FIG. 3A through FIG. 3J show the process for forming the dual layer coil. The dual layer coil forming process and the effect are described next while referring to the drawings.

A metallic film 14 comprising the lower coil is formed (FIG. 3B) on the insulating film 13 (FIG. 3A) formed on the lower magnetic core. This metallic film 14 is utilized as an etching stopping film during RIE of the alumina insulating film described later so a material difficult to etch by chlorine gases such as CL2 and BCL3 is preferred. Ideal materials for example are Cr and NiF and a film thickness of 200 to 300 Å is sufficient.

A photoresist stopping pattern 15 (FIG. 3C) is next formed on the metallic film 14 and a specified pattern is formed by wet etching or dry etching.

Figure 3A:
FIG. 3A, FIG. 3B, FIG. 3C, FIG. 3D, FIG. 3E, FIG. 3F, FIG. 3G, FIG. 3H, FIG. 3I, FIG. 3J show the process for forming the dual layer coil.
Figure 3B:
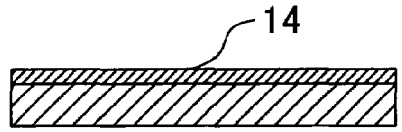
Figure 3C:
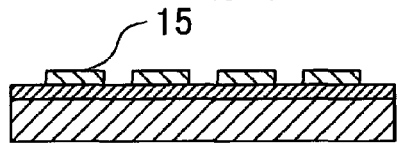
Figure 3D:
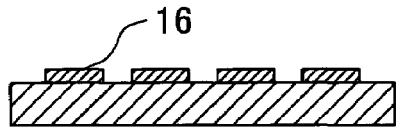

A lower coil 16 (etching stopper layer) is in this way formed (FIG. 3D).

Figure 3E:
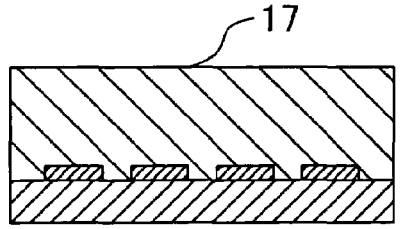

After forming the lower coil, an alumina or an inorganic compound containing alumina 17 is formed by the sputter method (FIG. 3E).

Figure 3F:
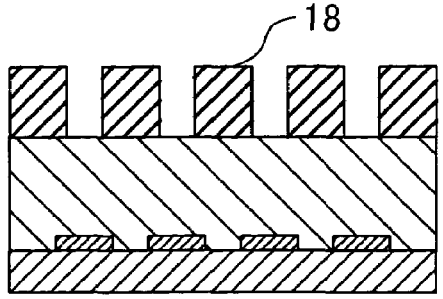

A resist mask 18 for etching the alumina or an inorganic compound containing alumina is then formed (FIG. 3F).

Figure 5:
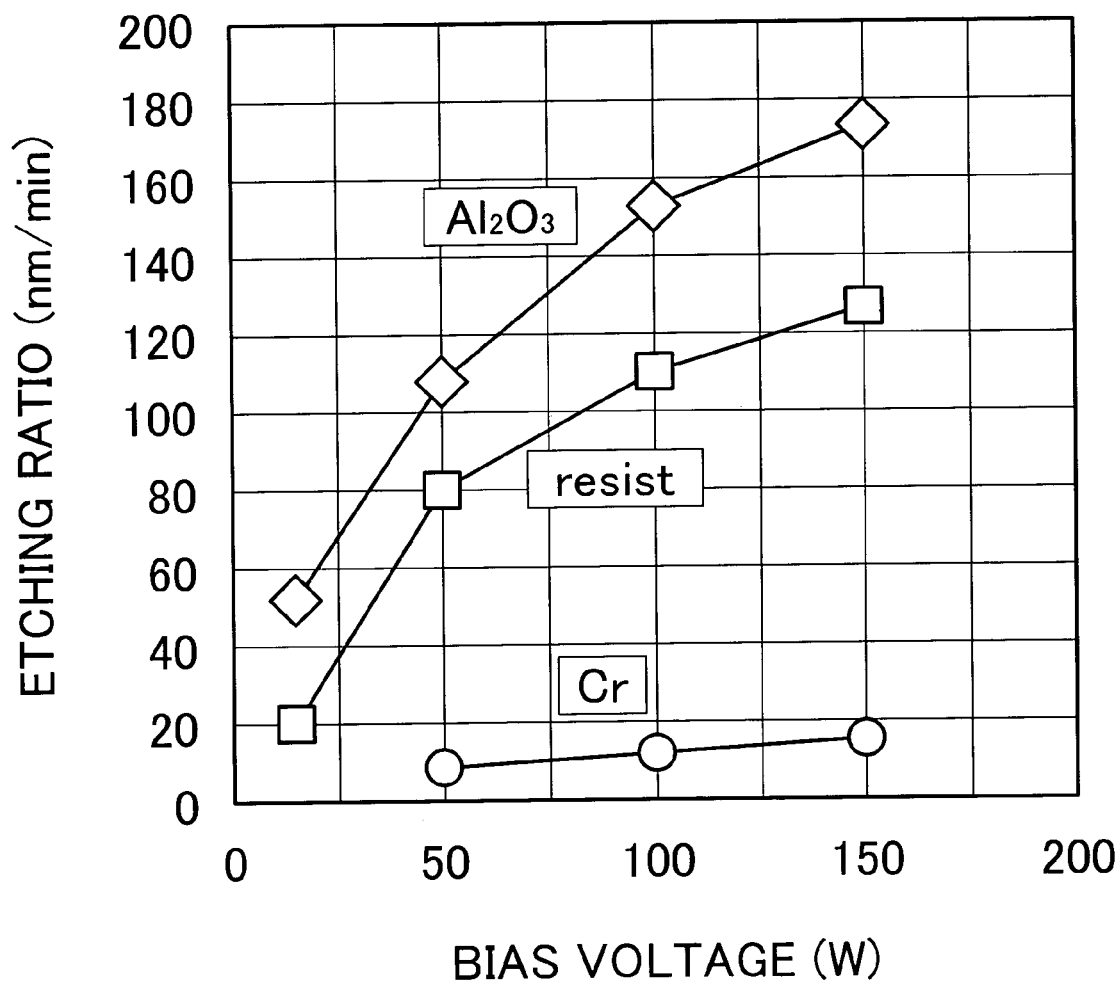
FIG. 5 is a graph showing the relation of etching bias (W) and alumina, resist, and chrome etching ratio (nm/min) when reactive ion etching (RIE) was performed.

The alumina is then etched utilizing this resist mask 18. Etching conditions were using an etching gas $BCL_3$, an etching power of 600 watts, a pressure of 0.5 Pa, a flow rate of 40 sccm. The etching speed (ratio) when the bias power was change is shown in FIG. 5.

As is clearly shown, when the bias (power) is 100 W, the alumina ($Al_2O_3$) etching speed (ratio) is 150 nm/min, the resist etching speed is 110 nm/min, and the chrome (Cr) etching speed is 10 nm/min. The selection ratio of $Al_2O_3$ and resist is therefore 1.4 and the selection ratio of $Al_2O_3$ and chromium is 15.

These results confirm that chromium is sufficiently effective as a stopping layer when etching alumina. Therefore, as effects other than a conductor, using chromium film as the lower coil will prove effective as a stopping layer for preventing the microloading effect during alumina etching, and uniform etching can be performed regardless of the size of the pattern width in the substrate.

In the previously described pattern plating forming method of the related art, a resist height greater than the plating film thickness was required. However, since the selection ratio for $Al_2O_3$ to resist is 1.4 by using RIE technology, then by simple calculation the resist film will be a thin 1/1.4. The resist pattern comprising the mask can therefore easily be given a narrow pitch.

In other words, the selection ratio for $Al_2O_3$ to resist when using RIE is large in the present invention. The upper coil resist 18 height can therefore be made small, pattern precision can be improved and a coil with a narrow pitch easily made which are effective in obtaining a short magnetic path length.

Figure 3G:
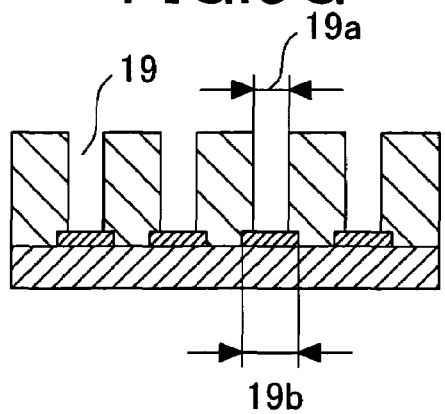

The unique feature of the present invention lies in this point. The shape 19 after alumina etching is shown in (FIG. 3G). The relation between the lower coil width (19b) and alumina etching width (19a) is important for obtaining the post-etching shape. The lower coil width 19b is preferably greater than or equal to the alumina etching width 19a. The lower coil width 19b should be as large as possible provided that no contact is made with the adjoining lower coil. A large coil width 19 has the advantage that besides the fact that the process margin grows larger during alumina etching, the contact surface area with the insulating film 13 becomes larger, heat dissipation becomes simpler and the rising temperature of the element becomes smaller, and there is a larger effect in reducing TPR.

Conversely, when 19b is less than 19a, the lower coil does not function as an etching stopper during etching of the alumina. The microloading due to RIE therefore penetrates to the magnetic film below the coil and consequently even if the coil is formed, defects occur due to shorts within the magnetic film. The ratio of the alumina etching width (19a) to lower coil width (19b) should therefore be a minimum of 1-to-1 (1:1). However, in view of production needs and alignment precision of the exposure equipment, a ratio of 1-to-1.2 (1:1.2) or more is required.

Figure 3H:
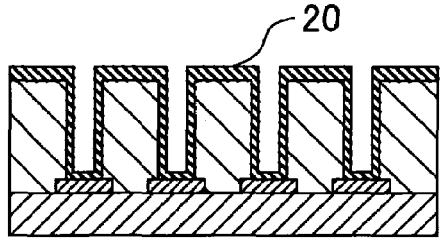
Figure 3I:
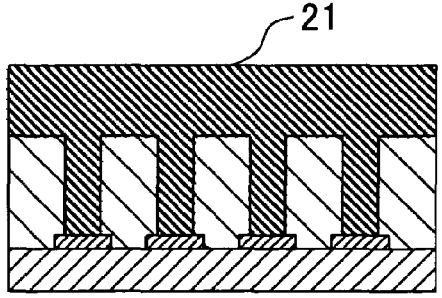
Figure 3J:
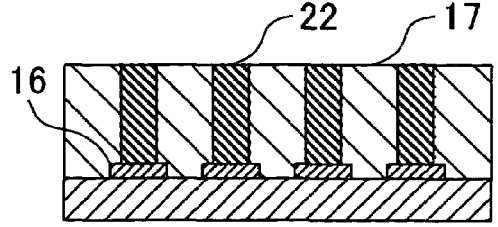
Figure 4:
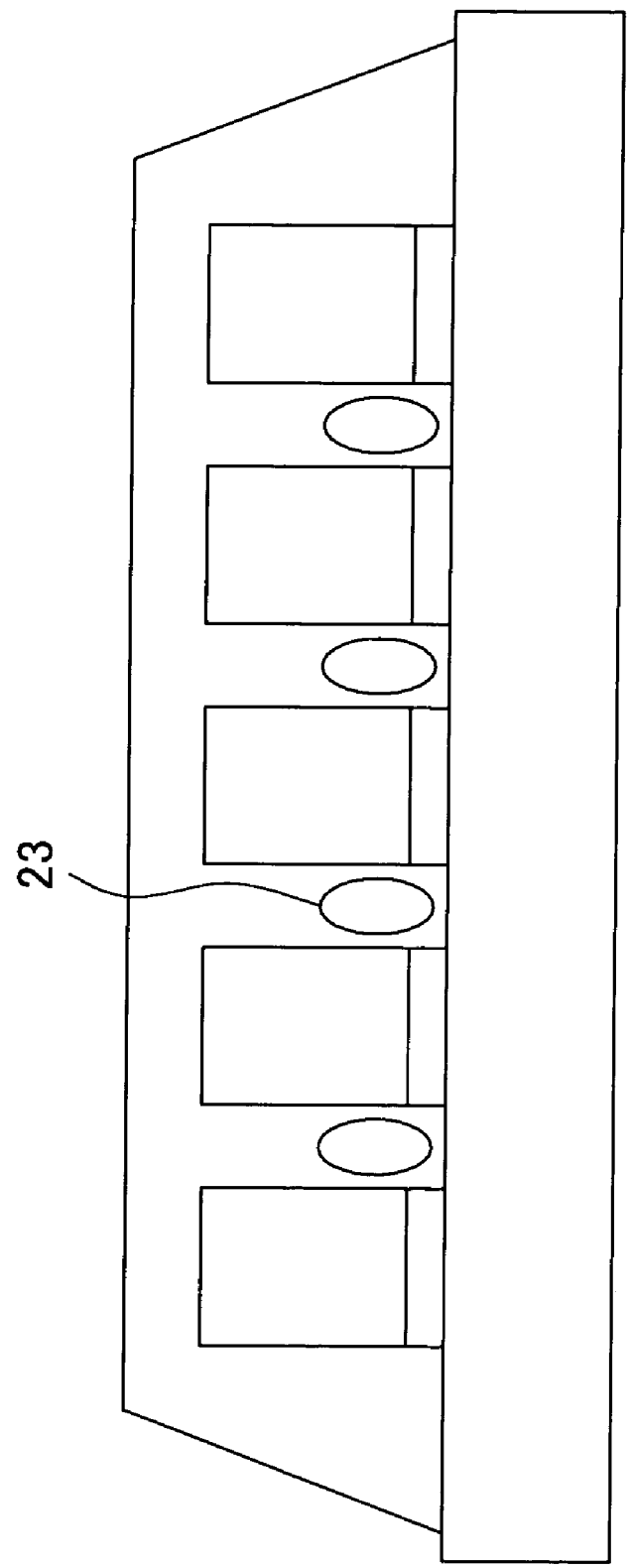
FIG. 4 is a cross sectional view showing the coil at a coil pitch of 2 μm or less in the coil forming method of the related art (However, drawing enlargement scale is not uniform.)

After etching the alumina insulating film to the specified shape, copper (Cu) plating is deposited above it to form the underlayer 20 (FIG. 3H). Laminated films (layers) such as tantalum and copper or chromium and copper may be utilized as the underlayer. The layer of tantalum and chromium as the lower layer of the laminated film not only improves the sealing of the alumina and copper, but also functions as a stopping film during CMP (chemical mechanical polishing) of the copper (Cu) plating in a process described later on.

The copper (Cu) plating film 21 (FIG. 3I) forming the upper coil is then deposited.

After Cu plating, the upper layer coil 22 (FIG. 3J) is formed by polishing the copper by CMP forming the upper coil 22(j) and the process of the invention is complete.

Figure 8:
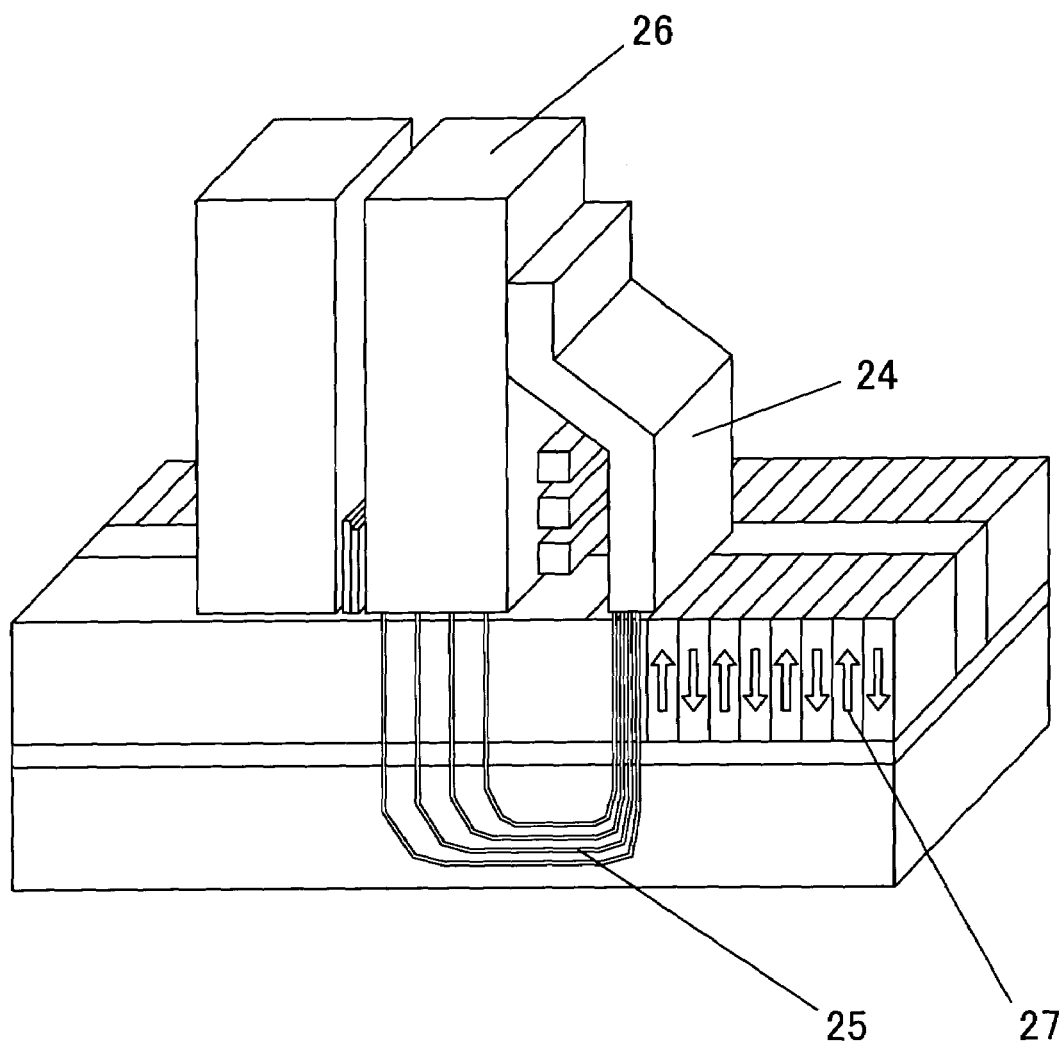
FIG. 8 is a drawing showing the principle of the perpendicular head of the present invention (However, drawing enlargement scale is not uniform.)

The two-layer coil of the invention can also be used for perpendicular magnetic recording heads as well as longitudinal write heads. A concept view of the perpendicular magnetic recording head is shown in FIG. 8. In the perpendicular magnetic recording method, a magnetic flux 25 generated from a main pole 24 is applied to the recording layer 27 of the medium and the plane of the recording layer is perpendicularly magnetized.

FIGS. 9A and 9B are cross sectional views showing the two-layer coil of the present invention utilized as a perpendicular magnetic recording head. In FIG. 9A, a main pole is installed on the trading side of the perpendicular magnetic recording head. In FIG. 9B, an auxiliary pole is installed on the trading side of the perpendicular magnetic recording head. TPR is also a critical problem in perpendicular magnetic recording heads so the two-layer coil of the invention is one effective means to resolve the problem. The method of the invention is applicable to other types of heads besides perpendicular magnetic recording heads and is applicable to any magnetic head housing a coil in an insulated state with an upper magnetic layer and a lower magnetic layer.

Figure 11:
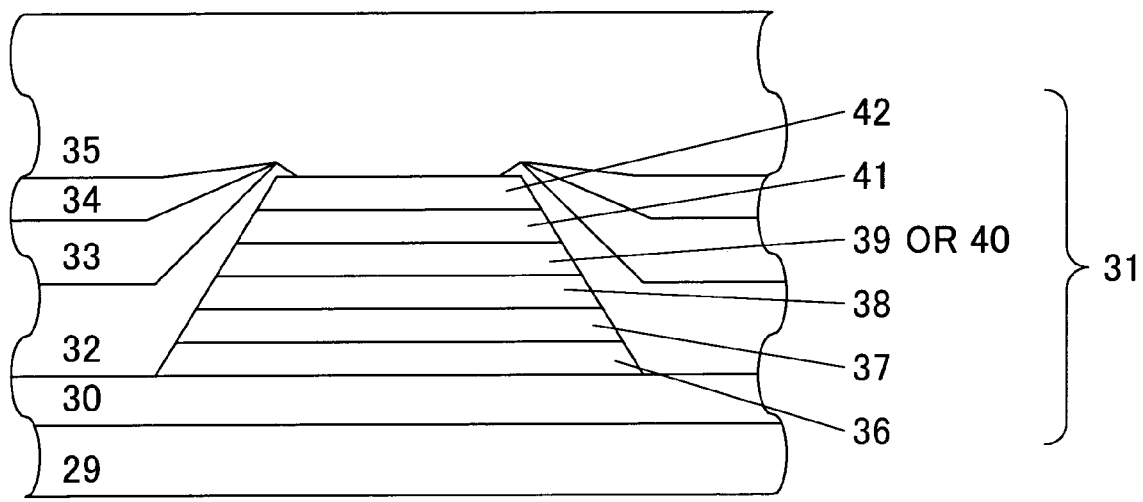
FIG. 11 is cross sectional concept drawing showing the tunnel magnetoresistive element (However, drawing enlargement scale is not uniform.)

FIG. 10 shows an example of a CPP (Current Perpendicular to the Plane) magnetic head for flowing a sense current so as to pass through the layered boundary of the magnetoresistive layer (layer). A summary of the process for fabricating the playback head is described next. FIG. 11 is drawing showing an enlarged view of the tunnel magnetoresistive element.

A lower lead (electrode) 30 also serving as the lower shield layer is first formed on the substrate 29. A magnetoresistive layer 31 is then formed and patterned into the desired shaped by photolithography and ion milling.

A first protective insulating layer 32, a hard magnetic film 33, and a second protective insulating layer 34 are then formed by the liftoff method on both ends of the magnetoresistive layer (layer) 31.

An upper lead (electrode) 35 serving as the upper shield layer is also formed. The magnetoresistive layer (layer) 31 is composed of an underlayer 36, an antiferromagnetic layer 37, a first ferromagnetic layer 38, a tunnel barrier layer 39 or an antiferromagnetic layer 40, a second ferromagnetic layer 41, and a protective layer 42.

The first ferromagnetic layer 38 is equivalent to a fixed layer and the second ferromagnetic layer 41 is equivalent to a free layer. The antiferromagnetic layer 37 is utilized to fix the magnetic orientation of the first ferromagnetic layer 38 (fixed layer) in one direction. The magnetic orientation of the second ferromagnetic layer 41 however is easily rotated by an external magnetic field. The relative angle of the first ferromagnetic layer 38 to the second ferromagnetic layer 41 therefore differs according to the magnetic field signal from the magnetic recording medium. The electrical resistance of the magnetoresistive layer (layer) 31 changes according to this angle to obtain a magnetically varied playback output.

A vertical magnetic field bias is applied to the second ferromagnetic layer 41 (free layer) by the hard magnetic layer 33 formed on both ends of the magnetoresistive layer (layer) 31. This vertical magnetic field bias suppresses Barkhausen noise and yields stable playback characteristics.

Here, the first protective insulating layer 32 and the second protective insulating layer 34 covering the hard magnetic layer 33 from above and below are formed to prevent the lower lead (electrode) 30 serving as the lower shield layer and the upper lead (electrode) 35 serving as the upper shield layer from shorting. The second protective insulating layer 34 therefore does not need to be formed. The lower shield layer and lower lead may therefore be formed separately as well as the upper shield layer and upper lead such as in the case of substrate, lower shield layer, lower gap, lower lead, and magnetoresistive layer.

The example for the magnetoresistive layer (layer) 31 described a laminated structure with the first ferromagnetic layer 38 on the side near the substrate 29. However, a structure with the opposite layer sequence of the underlayer 36, second ferromagnetic layer 41, tunnel barrier layer 39, first ferromagnetic layer 38, antiferromagnetic layer 37, and protective layer 42 may also be used.

Besides single layer films such as NiFe and CoFe, the first ferromagnetic layer 38 and second ferromagnetic layer 41 as structural elements of the magnetoresistive layer (layer) 31 may also be multilayers of ferrite such as CoFe and NiFe, or may be synthetic antiferro magnetic structures such as CoFe/Ru/CoFe, etc.

The magnetoresistive magnetic head utilizing the tunneling magnetoresistive (film) layer as the film rendering the magnetoresistive effect was explained above. The structure of the magnetic head when a CIP (current into the plane) giant magnetoresistive (film) layer allowing sensing current to flow along the plane of the boundary layer of the magnetoresistive layer as shown in FIG. 2 or when a non-magnetic conductive layer 40 was formed in the intermediate layer instead of the tunnel barrier layer 39 are identical, so a detailed description is omitted.

The structural elements of the magnetoresistive head are described next.

In the present invention there are no special restrictions on the substrate, shield, gap, hard magnetic layer and electrode so an example describing typically used materials is given. In this example, AlTiC, SiC were used as the substrate and were covered by $Al_2O_3$. An alloy of NiFe and its nitride was used as the shield and may be single or multilayers of non-crystallized alloy CoZr or CoHf or CoTa, etc. Here, $Al_2O_3$, AlN, $SiO_2$ and a mixture of these elements were used as the gap. An alloy CoPt or CoPt added with Pt, $ZrO_2$ were used as the hard magnetic layer. Chromium, α-Ta, Au Mo, Rh, Ir were utilized as the electrode.

An example of the layer structure of the magnetoresistive layer is shown next. Here, the figure in the ( ) (parentheses) indicates the film thickness and the figures are in nanometers (nm). The magnetoresistive layer is preferably Ta (2.5)/ NiFeCr (3.5)/ NiFe (1)/MnPt (12)/CoFe (1.5)/Ru (0.8)/CoFe (2)/Al (0.45)–oxide/CoFe (1)/NiFe (2)/Ta (3), etc.

In view of the need for control and efficient productivity, the layer is preferably formed by the sputter method. In the hard magnetic layer, iron, cobalt and nickel are utilized as the main material because of their high spin polarization rate for Fermi energy. This Fermi energy spin polarization imparts a large resistance change ratio to the hard magnetic layer which has a large effect on playback output. Besides the change in resistance, the composition and the film thickness of the layer should be adjusted as needed to obtain low magnetic distortion, low magnetic force retention, a large magnetic coupling field imparted from the antiferromagnetic layer, and a symmetrical playback waveform.

The tunnel barrier layer is formed by the natural oxidation method wherein oxygen is fed into a chamber after forming an aluminum film. The layer may also comprise aluminum, silicon, zirconium, hafnium, tantalum or magnesium, etc. Oxides or nitrides may be formed or the layer may be directly formed of $Al_2O_3$ or AlN, $SiO_2$, SiN, $Ta_2O_5$, MgO, etc.

Here, a regular alloy MnPt layer was utilized as the antiferromagnetic layer for fixing the magnetic orientation of the first ferromagnetic layer (fixed) layer perpendicular to the ABS surface. A regular antiferromagnetic layer expressed by $Mn-M_1$ may also be utilized. Here, $M_1$ is an element comprised of at least one or more from among Ni, Ru, Rh, Pd, Ir, and Pt.

Heat treatment was performed on the magnetic field to obtain an exchange coupling field $H_{ua}$. The heat treatment was performed in a vacuum at $1 \times 10^{-3}$ Pa while applying a 240 kA/m field in one direction, and was maintained for 3 hours. Heat treatment from 230 to 270 degrees centigrade is required in order to obtain a sufficiently large $H_{ua}$ for the magnetic head. The higher the heat treatment temperature, the larger the $H_{ua}$ becomes. However, preferably, the heat treatment temperature should not be raised to 300 degrees centigrade or higher because the resistance change ratio diminishes, a large interlayer coupling (magnetic) field might effect the free layer and fixed layer.

Figure 12:
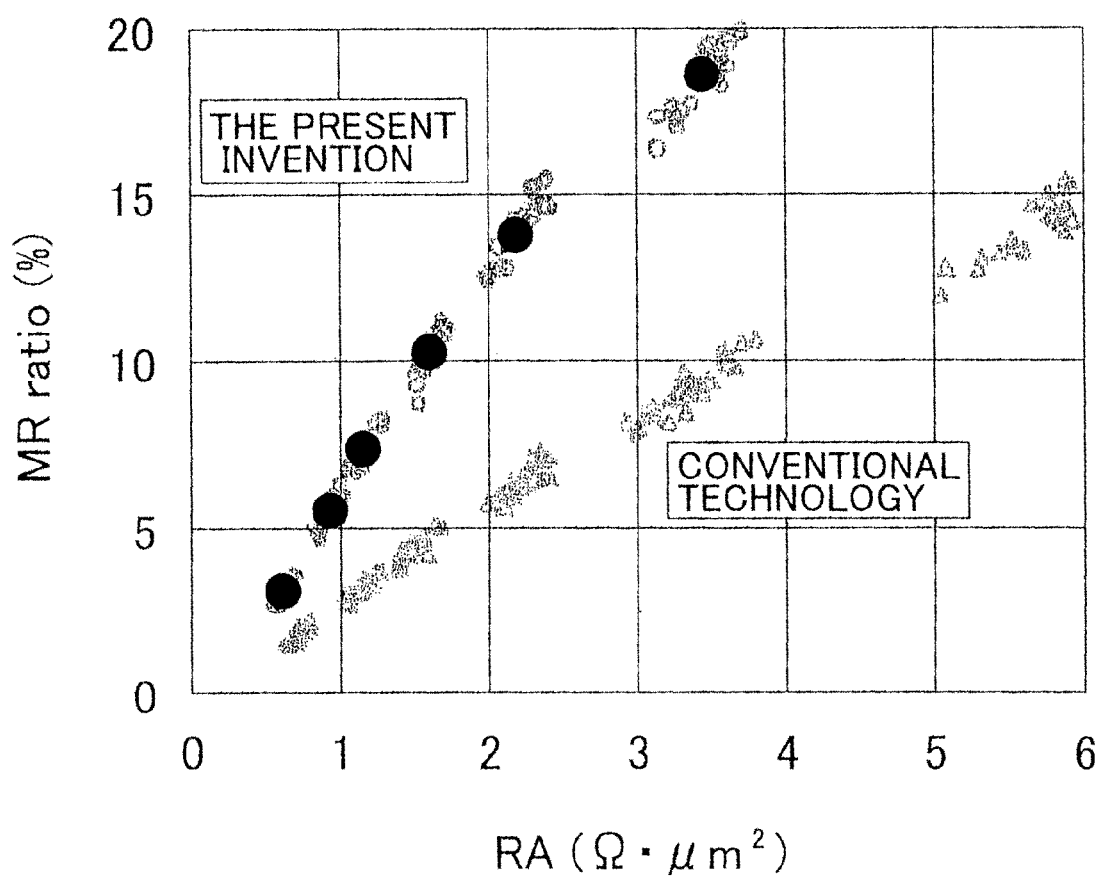
FIG. 12 is a graph showing how the resistance value changes with surface area in the magnetoresistive element, in the case of the related art and the case of the technology of the present invention.

FIG. 12 is a graph shows the interdependency of the MR ratio (resistance change ratio in magnetoresistive element) and RA (surface area resistance) when the related art is used when the present invention is used. In the pattern plating method of the related art, heat treatment was performed twice at 250 degrees centigrade for 3 hours in order to harden the resist. However in the present invention, no heat treatment is required whatsoever. When using the same RA (surface area resistance), the present invention yielded an MR ratio (resistance change ratio in magnetoresistive element) twice as high as the related art. The structure of the present invention is therefore capable of high playback sensitivity.

The essential effect of the present invention can also be obtained when a sensor layer other than a tunnel magnetoresistive layer, such as a CPP-GMR layer is utilized as the magnetoresistive layer 31. In the case of a CPP-GMR layer, antiferromagnetic layer 40 is utilized instead of the tunnel barrier layer 39 of FIG. 11. However, a thin film containing at least one element from among copper, gold or silver may be utilized as this layer.

Besides the above, the layer may be a thin film containing a conductive material and at least one material selected from among oxides, nitrides, carbides and boride groups; for example, a laminated material composed of a copper layer, an oxidized thin film containing at least one element from among cobalt, iron, and nickel, and a copper layer. A large effect equal to using the tunnel magnetoresistive layer can in particular be obtained by using an oxidized layer of thin film containing at least one element from among cobalt, iron and nickel.

In other words, utilizing the present invention yields an MR ratio (resistance change ratio in magnetoresistive element) from 1.5 to 3 times higher than in the related art. Therefore, high playback (reproduction) sensitivity can be obtained by applying the present invention, even when using a playback head with a CPP-GMR layer.

The magnetoresistive magnetic head fabricated by the method of the present invention shows satisfactory playback characteristics and can be mounted in magnetic recording and playback devices such as high surface recording density magnetic disk units and magnetic tape units.

The present invention has excellent heat dissipation while also possessing a narrow coil pitch and is therefore capable of providing a thin-film magnetic head that prevents thermal protrusion.

The manufacturing method for the magnetic head of the present invention contains a structure allowing good radiation of heat from the coil and a narrow pitch coil shape so the depth of the coil trench can be controlled with fine precision.

What is claimed is:

1. A magnetic head comprising a lower shield layer, upper shield layer, magnetoresistive layer element formed between said lower shield layer and said upper shield layer, a lower layer magnetic pole, an upper layer magnetic pole and a coil, wherein said coil is composed of a lower coil contacting with an upper coil, and the width of said lower coil is larger than the width of said upper coil, and wherein said lower coil is composed of an etching stop layer.

2. A magnetic head according to claim 1, wherein said coil is enclosed in insulating material and said insulating material is an inorganic compound of one or more types selectable at least from among $Al_2O_3$, $SiO_2$, $ZrO_2$.

3. A magnetic head according to claim 1, wherein said magnetoresistive layer element is composed of a plurality of laminated materials containing at least a first ferromagnetic layer, an intermediate layer, and a second ferromagnetic layer; and the magnetization direction of said first ferromagnetic layer is fixed with respect to the magnetic field signal to be sensed, the magnetization of said second ferromagnetic layer rotates according to said magnetic field signal.

4. A magnetic head according to claim 3, wherein said intermediate layer is a tunnel barrier layer, an electrode is formed to allow sensing current to pass the boundary between said first ferromagnetic layer and said tunnel barrier layer, and the boundary between said tunnel barrier layer and said second ferromagnetic layer.

5. A magnetic head according to claim 4, wherein said tunnel barrier layer is composed of at least one of aluminum oxide, silicon oxide, zirconium oxide, hafnium oxide, tantalum oxide, magnesium oxide, aluminum nitride, silicon nitride, zirconium nitride, and hafnium nitride.

6. A magnetic head according to claim 3, wherein said intermediate layer is an antiferromagnetic layer, and an electrode is formed to allow sensing current to pass the boundary between said first ferromagnetic layer and antiferromagnetic layer, and the boundary between antiferromagnetic layer and said second ferromagnetic layer boundary.

7. A magnetic head according to claim 3, wherein said intermediate layer is composed of a conductive material and one material selected from among at least oxides, nitrides, carbides and boride groups; and an electrode is formed so that sensing current passes through the boundary between said first ferromagnetic layer and said intermediate layer, and the boundary between said intermediate layer and said second ferromagnetic layer.

8. A magnetic head according to claim 7, wherein said intermediate layer is a laminated material composed of a copper layer; an oxidized layer of thin film containing at least one element from among cobalt, iron, and nickel; and a second copper layer.

9. A magnetic head comprising a lower shield layer, upper shield layer, magnetoresistive layer element formed between said lower shield layer and said upper shield layer, a lower layer magnetic pole, an upper layer magnetic pole and a coil, wherein said coil is composed of a lower coil stacked directly in contact with an upper coil, and the width of said lower coil is larger than the width of said upper coil, and wherein said lower coil is composed of an etching stop layer.

10. A magnetic head according to claim 9, wherein said coil is enclosed in insulating material and said insulating material is an inorganic compound of one or more types selectable at least from among $Al_2O_3$, $SiO_2$, $ZrO_2$.

11. A magnetic head according to claim 9, wherein said magnetoresistive layer element is composed of a plurality of laminated materials containing at least a first ferromagnetic layer, an intermediate layer, and a second ferromagnetic layer; and the magnetization direction of said first ferromagnetic layer is fixed with respect to the magnetic field signal to be sensed, the magnetization of said second ferromagnetic layer rotates according to said magnetic field signal.

12. A magnetic head according to claim 11, wherein said intermediate layer is a tunnel barrier layer, an electrode is formed to allow sensing current to pass the boundary between said first ferromagnetic layer and said tunnel barrier layer, and the boundary between said tunnel barrier layer and said second ferromagnetic layer.

13. A magnetic head according to claim 12, wherein said tunnel barrier layer is composed of at least one of aluminum oxide, silicon oxide, zirconium oxide, hafnium oxide, tantalum oxide, magnesium oxide, aluminum nitride, silicon nitride, zirconium nitride, and hafnium nitride.

14. A magnetic head according to claim 11, wherein said intermediate layer is an antiferromagnetic layer, and an electrode is formed to allow sensing current to pass the boundary between said first ferromagnetic layer and antiferromagnetic layer, and the boundary between antiferromagnetic layer and said second ferromagnetic layer boundary.

15. A magnetic head according to claim 11, wherein said intermediate layer is composed of a conductive material and one material selected from among at least oxides, nitrides, carbides and boride groups; and an electrode is formed so that sensing current passes through the boundary between said first ferromagnetic layer and said intermediate layer, and the boundary between said intermediate layer and said second ferromagnetic layer.

16. A magnetic head according to claim 15, wherein said intermediate layer is a laminated material composed of a copper layer; an oxidized layer of thin film containing at least one element from among cobalt, iron, and nickel; and a second copper layer.

17. A magnetic head comprising a lower shield layer, upper shield layer, magnetoresistive layer element formed between said lower shield layer and said upper shield layer, a main pole, a return pole, and a coil, wherein said coil is composed of a lower coil contacting with an upper coil, and the width of said lower coil is larger than the width of said upper coil, and wherein said lower coil is composed of an etching stop layer.

18. A magnetic head according to claim 17, wherein said coil is enclosed in insulating material and said insulating material is an inorganic compound of one or more types selectable at least from among $Al_2O_3$, $SiO_2$, $ZrO_2$.

19. A magnetic head according to claim 17, wherein said magnetoresistive layer element is composed of a plurality of laminated materials containing at least a first ferromagnetic layer, an intermediate layer, and a second ferromagnetic layer; and the magnetization direction of said first ferromagnetic layer is fixed with respect to the magnetic field signal to be sensed, the magnetization of said second ferromagnetic layer rotates according to said magnetic field signal.

20. A magnetic head according to claim 19, wherein said intermediate layer is a tunnel barrier layer, an electrode is formed to allow sensing current to pass the boundary between said first ferromagnetic layer and said tunnel barrier layer, and the boundary between said tunnel barrier layer and said second ferromagnetic layer.

21. A magnetic head according to claim 20, wherein said tunnel barrier layer is composed of at least one of aluminum oxide, silicon oxide, zirconium oxide, hafnium oxide, tantalum oxide, magnesium oxide, aluminum nitride, silicon nitride, zirconium nitride, and hafnium nitride.

22. A magnetic head according to claim 19, wherein said intermediate layer is an antiferromagnetic layer, and an electrode is formed to allow sensing current to pass the boundary between said first ferromagnetic layer and antiferromagnetic layer, and the boundary between antiferromagnetic layer and said second ferromagnetic layer boundary.

23. A magnetic head according to claim 19, wherein said intermediate layer is composed of a conductive material and one material selected from among at least oxides, nitrides, carbides and boride groups; and an electrode is formed so that sensing current passes through the boundary between said first ferromagnetic layer and said intermediate layer, and the boundary between said intermediate layer and said second ferromagnetic layer.

24. A magnetic head according to claim 23, wherein said intermediate layer is a laminated material composed of a copper layer; an oxidized layer of thin film containing at least one element from among cobalt, iron, and nickel; and a second copper layer.

* * * * *